Jan. 31, 1956  H. L. MÄRKY  2,733,056
MIXING OF GASES AND LIQUIDS
Filed Feb. 28, 1952  2 Sheets-Sheet 1
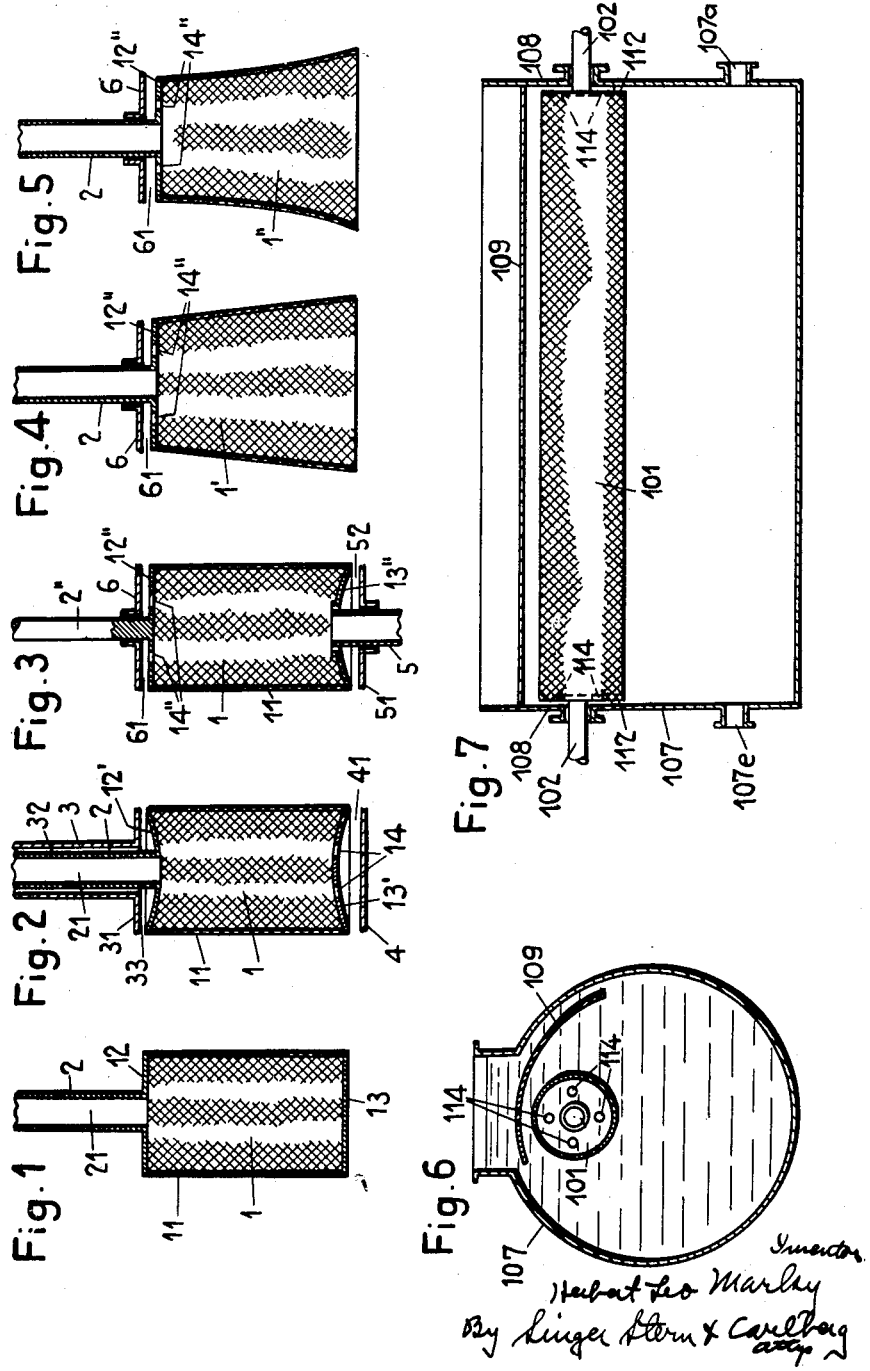

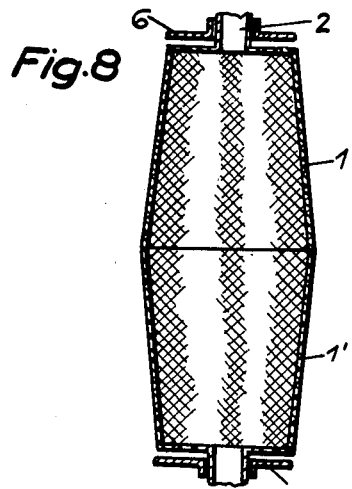
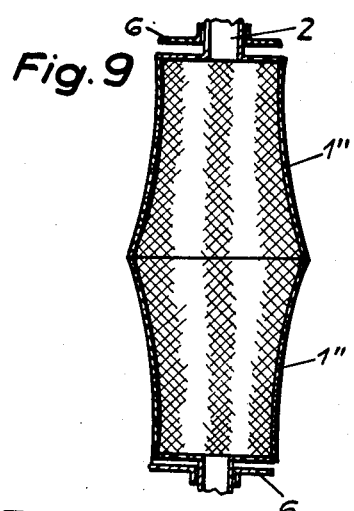
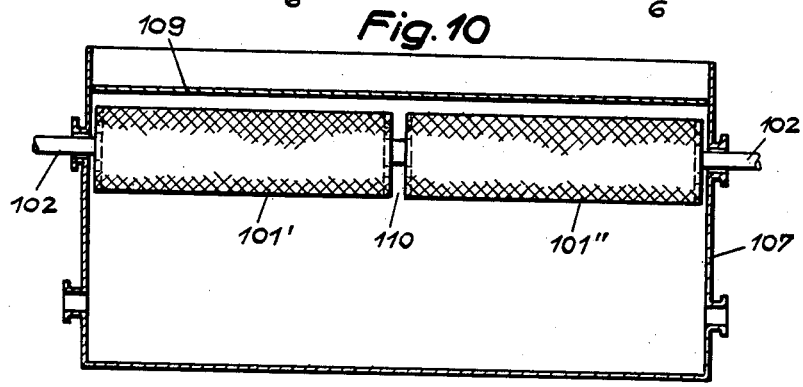
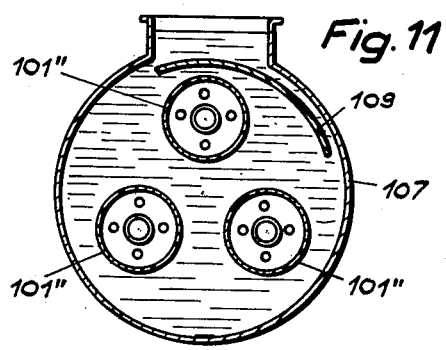
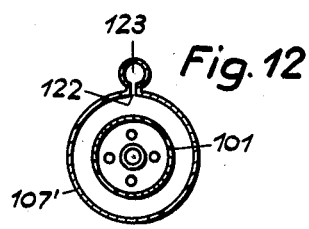

United States Patent Office 2,733,056
Patented Jan. 31, 1956

2,733,056
MIXING OF GASES AND LIQUIDS

Herbert Leo Märky, Zurich, Switzerland, assignor to Kerag Kesselschmiede, Apparate- und Maschinenbau, Zurich, Switzerland Application February 28, 1952, Serial No. 273,971

1 Claim. (Cl. 261—87)

The invention relates to the mixing of gases with liquids, both to a method of mixing and to a device for performing such method.

It is a main object of the invention to provide a method for intimately mixing the gas and liquid with a minimum of mechanical power required for the operation.

It is an additional object of the invention to provide a method for generating a foam of the gas in the liquid and to allow the mechanical movement of the mixing device to take place within the gas or foam rather than in the liquid so as to reduce the mechanical power required for operating the mixing device.

It is another main object of the invention to provide a device for the mixing of gases with liquids which is simple in construction, which is effective and reliable in operation, and which is operated with a minimum of mechanical power for driving the same.

It is still another object of the invention to provide a device for the mixing of gases with liquids, wherein the movable components are moved along a boundary of liquid and gas rather than against a compact mass of liquid, and are moved in a layer of foam or gas rather than in liquid, whereby the requirements of mechanical power for driving the device are reduced to a minimum.

With these and other objects in view, I provide a method for the mixing of gases and liquids, comprising the steps of introducing the gas axially into a cavity surrounded by the liquid, and passing the said gas from the said cavity into the surrounding liquid on a plurality of paths through a rotating boundary layer, and I also provide a device for the mixing of gases with liquids comprising in combination a rotatable hollow body of rotation having two end walls and a circumferential wall, at least the said circumferential wall being perforated in a sieve-like manner, and gas supply means axially issuing into the interior of the said hollow body.

Further features of the invention will become apparent later from the specification.

It will be easily realised that the liquid can not maintain itself within such a rotating sieve body, but is driven out through the sieve face by the action of the centrifugal forces overriding the action of the static pressure of the liquid, so that the interior of the sieve body, which is in communication with the gas space, is practically filled with gas only. It has however been found rather surprisingly that an intense foam formation and a correspondingly intimate mixing of liquid and gas takes place along the circumference of the sieve body and that gas is continuously sucked in or can be supplied under excess pressure, which considerably increases the output, while the foam formed flows away in the liquid container from the rotating sieve body. In this way large quantities of gas can be admixed to the liquid in the most intensive manner. A particular advantage of this arrangement consists in that the circumference of the sieve body need not be moved against the compact mass of liquid, but can revolve in a layer of foam whereby the power required for rotating the sieve is considerably reduced. By the arrangement of stationary walls opposite the rotating end faces of the sieve body it can be achieved that the end faces, too, of the sieve body rotate practically in a gaseous medium instead of in a liquid, when this interstice between the face of the stationary wall and the rotating end face is in communication with such portions of the space as are filled with gas at least in operation.

In order that the invention may be better understood and readily carried into effect, some embodiments thereof will now be described by way of example, with reference to the accompanying drawings, in which:

Fig. 1 is an axial section of a cylindrical sieve body.

Fig. 2 is an axial section of a cylindrical sieve body having concave end walls, Fig. 3 is an axial section of a cylindrical sieve body having a stationary gas supply pipe, Fig. 4 is an axial section of a frusto-conical sieve body, Fig. 5 is an axial section of a bell-shaped sieve body, Fig. 6 is a cross section, and Fig. 7 is a longitudinal section of a mixing device comprising a rotatable sieve body extending over the full length of the liquid container, Fig. 8 is an axial section of a double frusto-conical sieve body, Fig. 9 is an axial section of a double bell-shaped sieve body, Fig. 10 is a modification of Fig. 7.

Fig. 11 is a modification of Fig. 6 showing several sieve bodies with parallel axes, and Fig. 12 is another cross section of a modified embodiment.

According to Fig. 1, the sieve body consists of a cylindrical hollow body 1 the whole circumference 11 of which is perforated in a sieve-like manner, and the end walls of which are denoted 12 and 13, respectively. A hollow shaft 2, which is attached in the axial direction to the end wall 12 of the sieve body 1, serves as the driving shaft, and its bore 21 is in communication with a gas storage container (not illustrated) or, if desired, with the free atmosphere.

According to Fig. 2, the sieve body 1 is likewise shaped cylindrically and is provided with concave, inwardly bulging end walls 12' and 13'. A hollow shaft 2, the bore 21 of which is in communication with a gas space, is attached to the end wall 12'. An outer tube 3 is shifted over this hollow shaft 2 and is provided with a flange 31 which is in juxtaposition to the face of the end wall 12' of the sieve body 1 at a short distance. The annular duct 32 between the hollow shaft 2 and the inner wall face of the outer tube 3 is also in communication with a gas container. This tube 3 is stationary in operation, and when the number of revolutions of the sieve body 1 is sufficiently high the liquid contained in the outwardly tapering interstice 33 is thrown outwards, and is followed up by gas from the annular duct 32, so that practically the whole face of the end wall 12' rotates in air. Opposite the face of the end wall 13', which is also provided with perforations 14, a stationary wall 4 is arranged so that an outwardly tapering interstice 41 is formed between the faces of the walls 13' and 4. Here, too, the liquid is thrown out of this interstice 41 when a sufficiently high number of revolutions is reached, and is followed up by gas from the interior of the sieve body 1 through the openings 14.

According to Fig. 3, the sieve body 1 is driven by a solid shaft 2''. A stationary gas supply pipe 5 issues into a central opening of the concave, inwardly bulging end wall 13'', the flange 51 of which lies opposite the face of the end wall 13'' so that, here too, the liquid is ejected from the interstice 52 between the faces of the end wall 13″ and of the flange 51, and is followed up by gas from the interior of the sieve body 1. Parallel to the face of the end wall 12″, at a short distance therefrom, a stationary wall 6 is provided, and the end wall 12″ is provided in its central portion with perforations 14″, so that, upon rotation, gas can follow up from the interior of the sieve body 1 through these perforations 14″ into the interstice 61 between the faces of the wall 6 and of the end wall 12″.

Figs. 4 and 5 correspond in principle to Fig. 1 in that the sieve bodies are attached to a hollow shaft 2, through the bore of which gas is supplied; however, in Fig. 4 the sieve body 1′ is shaped frusto-conical, and in Fig. 5 the sieve body 1″ is bell shaped. In order to prevent the faces of the end walls 12″ of the sieve bodies from rotating in the liquid, these walls are provided with perforations 14″, and stationary walls 6 are arranged opposite of them as according to Fig. 3.

According to the embodiment of Figs. 6 and 7, within a liquid container 107, the cross section of which is here also circular, an elongated sieve body 101 is arranged parallel to the axis thereof on a hollow shaft 102. The faces of the end walls 108 of the container 107 lie at a short distance from the faces of the end walls 112 of the sieve body 101, and the interstices between these faces are connected by perforations 114 to the interior of the sieve body 101. These end walls 108 have accordingly the same function as the walls 6 described with reference to Figs. 3, 4 and 5. A built-in baffle 109 serves for directing the liquid set in rotation by the sieve body 101 within the container 107 in such a manner that the foam generated can not flow off directly through the upper opening of the container 107, but is guided along the longest path possible through the liquid.

The invention is based on the fact, that when a rotary body having a sieve covering rotates in a liquid, turbulent flows are created around said rotary body with high velocities of flow in the border region between the turbulent layer and the main body of liquid around the same. The differences of velocity between the layer of turbulent flow and the slower moving body of liquid around the same cause differences in pressure which are believed to be the main reason for the increased dissolution speed which amounts to from four to ten times the speed of dissolution in prior art mixing devices.

The principal inventive idea is to avoid any disturbance of the creation of said turbulent flows. This is in complete contradistinction to prior art devices, in which baffle members have been arranged on the sieve drum or in the region around the same for the express purpose of disturbing, or breaking up, said turbulent flows. This is exactly what should be avoided. If baffle members are employed, they must be arranged so as not to disturb said natural turbulence created by the freely rotating drum.

Another discovery underlying the present invention is that when using a drum of the type set forth, a relative vacuum is created which serves to suck in the gases. Thus, the gases are supplied without pressure in excess of what is required to overcome the hydrostatic pressure.

Tests have shown that these innovations which, at a first glance, may appear insignificant, actually are of the utmost importance. The savings in energy amount to as much as 30 to 40 percent. The improved speed of dissolution has been referred to above. As an example, it was found that the air-oxygen exchange in phenol containing liquids amounts to 60%, as compared to 18 to 20% in prior art devices. It was also found that the absorption capacity of no longer absorption capable gases in Rascher columns extends almost to the chemically feasible limit.

In Figs. 8 and 9 the shapes of the sieve bodies of Figs. 4 and 5, respectively are duplicated; in Fig. 8 the sieve body consists of two truncated hollow cones 1′, 1′ connected with one another at their large circumferences, and in Fig. 9 of two bell shaped hollow bodies 1″, 1″ also connected with one another at their large circumferences.

As shown in Fig. 10, the sieve body may be subdivided into sections 101′, 101″ arranged on the same hollow shaft 102 and separated by recesses such as 110. When provision is made that air may flow into these interstices from the interior of the sieve body sections 101′, 101″ these interstices 110 remain free from liquid in operation, and any increase of windage losses on their end faces is obviated.

In Fig. 11 it is shown how several sieve bodies 101″ can be arranged parallel to one another within the same liquid container 107.

In Fig. 12 an embodiment is shown which has a liquid container 107′ which is completely closed except on the top where it has some small vent holes 122 leading into a gas discharge manifold 123, to prevent the formation of gas cushions in the container 107′. The sieve body 101 may be arranged concentrically with the container 107′ which has also a circular cross section. In such an arrangement the whole liquid takes part in the rotation of the sieve body 101 so quickly that the buoyancy of the gas bubbles is cancelled out by centrifugal force.

With such a device it is for example possible to impregnate the liquid with gas in a straight-through flow, liquid being introduced through a port such as 107e of Fig. 7, and being withdrawn through a port 107a. This is particularly suitable for ozonizing water.

While I have described and illustrated what may be considered as typical and particularly useful embodiments of my said invention, I wish it to be understood that I do not limit myself to the particular details and dimensions described and illustrated, for obvious modifications will occur to a person skilled in the art.

What I claim as my invention and desire to secure by Letters Patent, is:

In a device for mixing gases with a liquid, a cylindrical vessel for said liquid having end walls and an elongated open neck portion at the top thereof extending longitudinally of said vessel and of less width than the diameter of said vessel, a cylindrical sieve drum mounted for rotation on a horizontal axis in said vessel and supported by said end walls, said sieve drum being provided with a continuous uninterrupted rigid peripheral surface having perforations for the passage of gas into the liquid contained in said vessel, end walls in said sieve drum arranged in spaced relation from the end walls of said vessel to provide a restricted pathway, a hollow shaft secured to one of said end walls of said drum and extending through one of the end walls of the vessel for introducing gases into the interior of said sieve drum, means for driving said sieve drum at a circumferential velocity such as to create a turbulent layer covering the entire peripheral surface and at least a part of the end walls, and an arcuately curved baffle plate arranged above the sieve drum across said neck portion within the vessel and extending horizontally with a portion thereof directed along a portion of said cylindrical vessel wall in the direction of rotation of said drum in order to direct foam and co-mingled gas in a direction downwardly within the liquid contained in the vessel.

References Cited in the file of this patent

UNITED STATES PATENTS

| | | |
|---|---|---|
| 76,114 | Stratton | Mar. 31, 1868 |
| 516,405 | Ruehr | Mar. 13, 1894 |
| 1,502,004 | Akins et al. | July 22, 1924 |
| 1,713,046 | MacIntosh | May 14, 1929 |
| 2,151,126 | Lockey | Mar. 31, 1939 |
| 2,559,164 | McAllister | July 3, 1951 |
| 2,608,399 | Alcock | Aug. 26, 1952 |

FOREIGN PATENTS

| | | |
|---|---|---|
| 9,784 | Great Britain | Apr. 17, 1897 |
| 49,844 | Netherlands | Jan. 15, 1941 |